No. 700,460. Patented May 20, 1902.
H. VAN BERESTEYN.
ROTARY MOTOR.
(Application filed Feb. 7, 1901.)
(No Model.) 2 Sheets—Sheet 1.
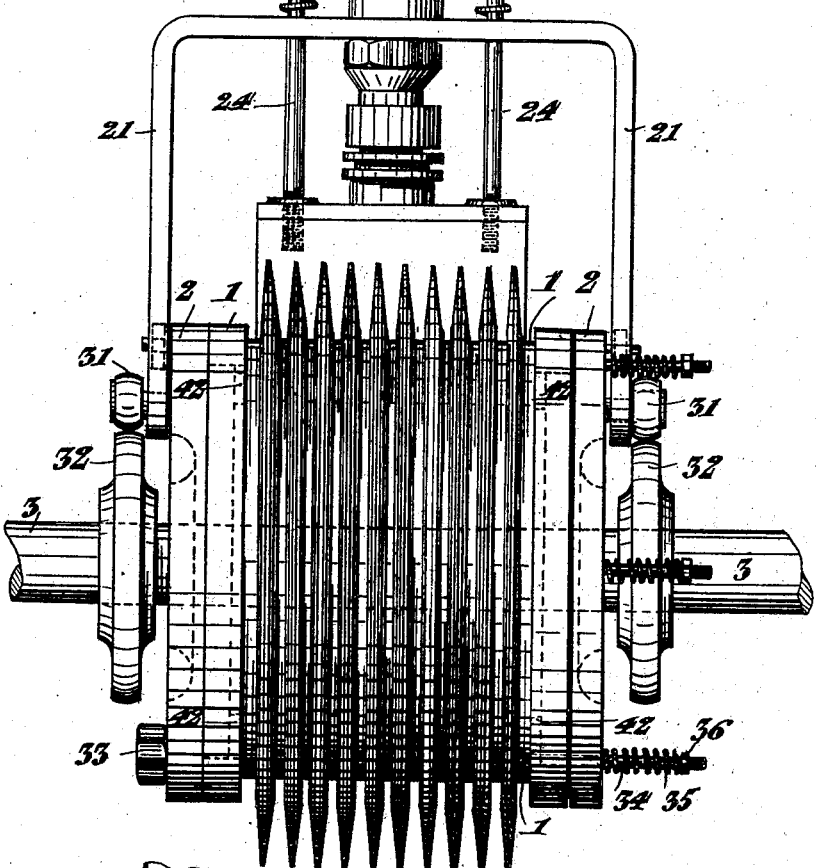
Fig. 1.
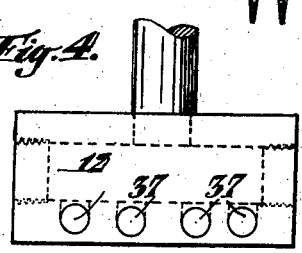
Fig. 4.
Fig. 5.
Witnesses: Inventor,
J. D. McMahon. Hugo van Beresteyn
G. S. Noble by B. Singer.
Att'y.
THE NORRIS PETERS CO., PHOTO-LITHO., WASHINGTON, D. C.

No. 700,460. Patented May 20, 1902.
H. VAN BERESTEYN.
ROTARY MOTOR.
(Application filed Feb. 7, 1901.)
(No Model.) 2 Sheets—Sheet 2.

Witnesses:
Inventor,
Hugo van Beresteyn
by B. Singer Att'y.

UNITED STATES PATENT OFFICE.

HUGO VAN BERESTEYN, OF BRUSSELS, BELGIUM.

ROTARY MOTOR.

SPECIFICATION forming part of Letters Patent No. 700,460, dated May 20, 1902.

Application filed February 7, 1901. Serial No. 46,344. (No model.)

*To all whom it may concern:*

Be it known that I, HUGO VAN BERESTEYN, a subject of the Queen of the Netherlands, and a resident of Brussels, Belgium, have invented certain new and useful Improvements in Rotary Motors, (for which I have made the following applications for patents: in Belgium, No.153,186, dated November 15, 1900; in France, No. 305,779, dated November 8, 1900;
in England, No. 1,071, dated January 16, 1901, and in Germany, No. B. 28, 105, I./46ª, dated November 23, 1900,) of which the following is a specification.

The object of my present invention is to provide an improved rotary motor adapted to serve various industrial purposes and applicable either to motor-vehicles or electric machines or the like.

The invention consists of the construction and novel combination of parts fully described and claimed hereinafter.

Figure 2:
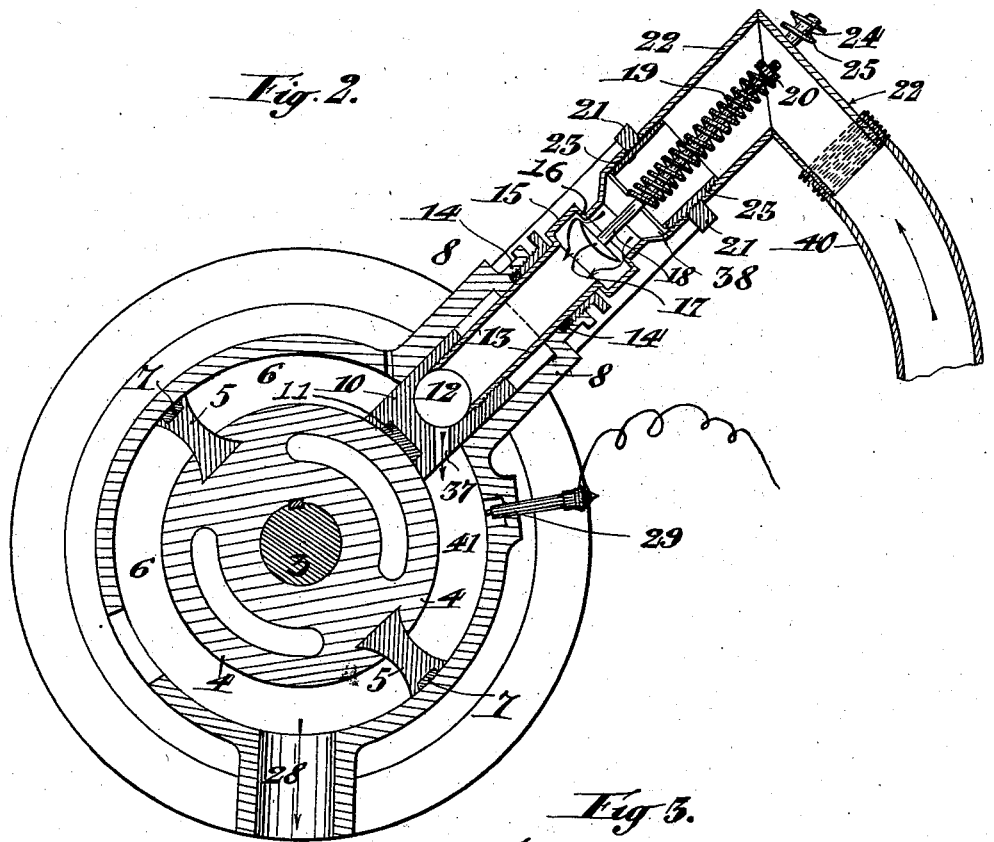
Figure 3:
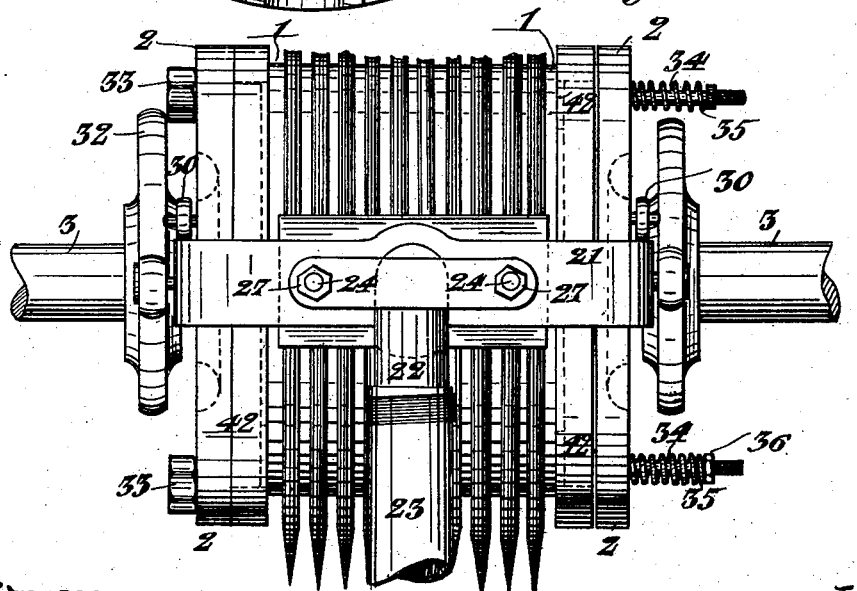

In the accompanying drawings, forming a portion of this specification, and in which like numerals refer to like parts, Figure 1 is a side elevation of the improved motor. Fig. 2 is a vertical sectional view. Fig. 3 is a plan view of the motor. Fig. 4 is a detail view showing the slide-valve. Fig. 5 is a detail view showing a stop ring or washer for the valve-stem.

Referring to the drawings, 1 represents a cylindrical casing formed at each end with a bottom plate, the bottom plate on the left-hand side being securely bolted to the casing, while the opposite bottom plate is held in place by means of rods 34, secured to the casing, and coiled springs 35, surrounding said rods and bearing at one end against the bottom plate and at the opposite end against the nuts 36, screwed to the rods 34. Both bottoms 2 2 are provided with central circular apertures for the passage and rotation of the shaft 3, extending centrally through the cylindrical casing 1. Two washers inserted between the bottom plates and the casing 1 secure perfect tightness.

Keyed on the shaft 3 is a cylinder 4, which may be recessed, as shown in Fig. 2, and which carries one or two pistons or rectangular wings 5, held in grooves provided in the cylinder-wall at diametrically opposite points thereof. Between the inner wall of the casing 1 and the cylinder 4 remains an annular space 6. The pistons 5 have a frictional engagement with the inner wall of the casing 1 through the agency of copper plates 7, held in grooves provided in the pistons and pressed against said inner wall by means of springs (not shown in the drawings) and housed in the cylinder 4 to secure perfect tightness.

Made one with the casing 1 is a box 8, provided with a slot in which is movably arranged a slide-valve 10, provided at its inner end with a copper plate 11, frictionally engaging the surface of the cylinder 4. Said slide-valve serves to form an explosion-chamber, which can be extended or made smaller by changing the cams 32, by means of which the explosive mixture is admitted during the rotation of the cylinder 4. For this purpose the slide-valve is provided with a longitudinal circular hole 12, parallel with the longitudinal axis of the motor and closed at both ends. Extending from said hole are four passages 37, discharging outside the valve. Screwed to the upper part of the slide-valve is a tube 13 in communication with the hole 12 and adapted to move in a stuffing-box 14. The tube 13 is provided with an enlarged part 15, the upper shoulder 16 of which forms the seating of the valve 17. The stem 18 of the latter extends loosely through a central hole provided in a plate 38, arranged within a second enlarged part of the tube 13. Said valve-stem carries a nut 20 at its upper screw-threaded end, and it is surrounded by a coiled spring 19, bearing against said nut and the plate or disk 38, said spring having a tendency to move the valve upwardly upon its seat.

The upper end of the tube 13 rests against the underside of the horizontal part of a stirrup 21, and it is connected, by means of a nipple 23, to an elbow 22, connected, by means of a flexible tube, to the explosive-mixture-compressing pump. (Not shown in the drawings.) The face ends of the stirrup are provided with rollers 31, engaging cams 32, keyed on the shaft 3, and said stirrup is guided by means of two rods 24, secured to the box 8 and extending loosely through holes in the stirrup, the upper ends of said rods carrying a cross-bar 26 and two nuts 27. The rods 24 are surrounded by coiled springs 25, bearing at one end against the under side of the cross-bar 26 and resting on the stirrup 21. The stirrup is further guided by means of two rollers 30, loosely mounted on studs secured to the bottom plates 2 2.

When the cylinder 4 is rotated, the slide-valve 10, resting on the periphery of the piston, forms at 41 an explosion-chamber. The gases compressed by means of the aforesaid pump force the valve 17 away from its seat and enter the slide-valve 10, whence they pass through the passages 37 into the explosion-chamber. The gases ignited by a suitable igniter, such as 29, are expanded and rotate the cylinder 4, while when the piston 5 (shown at the upper part of Fig. 1) arrives at the valve 10 the latter is withdrawn by the operation of the stirrup and the cams within the box 8 to enable said piston to freely pass, whereupon the slide-valve 10 is forced instantaneously back upon the periphery of the cylinder 4 by springs 25. When the first piston has reached the exhaust-opening 28, the burned mixture will escape, while another explosion causes the ignited gases to act on the second piston.

Each end of the cylinder 4 is tightly closed by means of a ring or washer 42, adapted to slide between the bottom plate of the casing 1 and the corresponding face of the cylinder 4.

The casing 1 is formed with annular ribs or wings to provide additional cooling-surface, as is well known in the art.

The motor may be constructed with a single piston, the cams and operating parts of the compression-pump being arranged accordingly.

Having fully described my invention, what I claim, and desire to secure by Letters Patent, is—

1. In the improved rotary motor, the combination with an outer cylindrical casing and a shaft extending centrally and loosely through the same, of an inner cylinder keyed on said shaft, a plurality of rectangular pistons securely arranged on the periphery of said inner cylinder, a suitable valve-box made in one piece with the outer casing, a slide-valve movably arranged in said valve-box and normally engaging the periphery of the inner cylinder; a suitable cam mechanism actuated by the shaft to move the slide-valve into its box at a given moment, passages in the slide-valve and in communication with the annular space between the inner cylinder and the outer casing; a fluid-admission tube connected to said passages, a normally closed valve in said tube and adapted to be opened by the pressure of the fluid, and an exhaust-opening in the outer casing, substantially as set forth.

2. In the improved rotary motor, the combination with the outer casing, a smaller inner cylinder rotatably mounted within said casing, and two rectangular pistons projecting radially at the periphery of the cylinder and frictionally engaging the inner wall of the outer casing, of a slide-valve normally engaging the periphery of the inner cylinder, a longitudinal bore in said valve and parallel with the longitudinal axis of the cylinder, a plurality of passages leading from said bore and discharging into the space between the inner cylinder and the outer casing, a suitable cam mechanism to actuate the valve at a given moment, a conduit connecting the bore of the slide-valve to a supply of compressed fluid, and a normally closed valve in said conduit and adapted to be opened by the pressure of the fluid, substantially as set forth.

In testimony whereof I have hereunto set my hand in presence of two witnesses.

HUGO VAN BERESTEYN.

Witnesses:
C. SCHER,
GREGORY PHELAN.